3,312,748
CATALYST FOR POLYMERIZATION, COPOLYMERIZATION AND ALKYLATION
Burnett H. Johnson, Baytown, Tex., assignor, by mesne assignments, to Esso Research and Engineering Company, Elizabeth, N.J., a corporation of Delaware
No Drawing. Filed Dec. 24, 1963, Ser. No. 333,205
10 Claims. (Cl. 260—671)

The present invention is directed to a catalyst for polymerization, copolymerization and alkylation. More particularly, the invention is concerned with a catalyst for polymerization, copolymerization and alkylation processes which utilize a Friedel-Crafts-type catalyst. In one of its more specific aspects, the invention is concerned with the polymerization of alpha olefins with a catalyst formed by admixing carbon tetrachloride with either aluminum triethyl, aluminum diethylchloride or aluminum ethyldichloride.

The present invention may be briefly described as an improvement in polymerization, copolymerization and alkylation processes which normally use a Friedel-Crafts-type catalyst which comprises utilizing as the catalyst the reaction product formed by admixing a compound having the formulae, $CX_4$ or $RCX_3$, where X is a halogen selected from Cl or Br and R is a $C_1$ to $C_{10}$ alkyl with a compound having the formula, $AlR_{3-n}X_n$ where R is a lower alkyl or aryl, X is a halogen selected from Cl or Br and $n$ may be 0, 1 or 2. The resulting reaction product exhibits catalytic properties of higher reactivity even at room temperatures.

The catalytically active reaction products of the present invention are produced by admixing an excess of a carbon tetrahalide or an alkyl haloform with a compound having the formula, $AlR_{3-n}X_n$, where R is an alkyl or aryl and $n$ may be 0, 1 or 2. It is preferred that the reaction product be formed with a carbon tetrachloride although carbon tetrabromide or a lower alkyl haloform may be used. The second reactant is preferably aluminum diethylchloride or aluminum ethyldichloride. It has been found that when an aluminum trialkyl, such as aluminum triethyl, is admixed with a carbon tetrahalide or an alkyl haloform as illustrated by carbon tetrachloride, it is instantly converted to an aluminum diethylhalide, namely, aluminum diethylchloride. Thus, the reaction products, when using an aluminum trialkyl or an aluminum dialkylhalide, appear to be substantially the same. Although ethyl is the preferred alkyl in the aluminum compounds, other alkyls may be used. The aluminum compound may also be triphenyl aluminum as illustrative of an aryl compound. It is to be noted that the reaction product formed by admixing carbon tetrachloride, for example, with aluminum diethylchloride does not produce a reaction product which is identical with the reaction product formed by admixing carbon tetrachloride with aluminum ethyldichloride. The reaction products appear to be distinct; and while both possess catalytic activity, the activity of each reaction product is materially different.

The structure of the reaction product formed by admixing a carbon tetrahalide or alkyl haloform with an aluminum trialkyl, aluminum dialkyl halide or aluminum alkyl dihalide is not known precisely. It is known, however, that a chemical reaction occurs on admixing the moieties in that a change in color is apparent, heat is evolved and a precipitate usually forms. It has been further established that the reaction product formed according to the present invention is chemically and catalytically different from either of the reactant compounds alone. The reaction product formed by admixing a carbon tetrahalide or alkyl haloform with an aluminum trialkyl, aluminum dialkylhalide or aluminum alkyl dihalide has been found to be useful as a catalyst in those processes normally utilizing a Friedel-Crafts catalyst illustrated by aluminum chloride; but due to the reactivity of the reaction product of the present invention, the processes may be carried out at conditions which heretofore were not possible.

The reaction product of the present invention may be used as a catalyst in the polymerization and copolymerization of olefins. The reaction products have been found to be effective catalysts, especially in the polymerization of alpha olefins, as exemplified by ethylene and propylene. Likewise, olefins, especially alpha olefins, may be copolymerized by utilizing the reaction products of the present invention. The catalytic activity of the reaction products of the present invention is not limited, however, to alpha olefins in that isobutylene may be polymerized to a polyisobutylene compound. Furthermore, the reaction products of the present invention are effective alkylation catalysts in the alkylation of aromatics in the presence of olefins. In each of the processes wherein the reaction products of the present invention are utilized, the catalytic reaction product is used in a ratio of about 1:5 to about 1:100 by weight of reactants in the polymerization, copolymerization or alkylation process. In polymerization, copolymerization or alkylation processes using other known Friedel-Crafts-type catalysts, a significantly greater amount of catalyst is necessary as well as in some cases a higher temperature to produce any significant products.

In the practice of the present invention, the reaction products formed may be produced as a catalyst material prior to the use in a polymerization, copolymerization or alkylation process; or the reaction products may be formed in situ in the desired process. The reaction products of the present invention, when produced prior to their use as a catalyst, are formed by admixing an excess of carbon tetrahalide or an alkyl haloform with either an aluminum trialkyl, aluminum dialkyl halide or aluminum alkyl dihalide. The excess carbon tetrahalide or alkyl haloform acts as the diluent for the reaction to form the catalytic reaction product. However, other inert diluents may be selected from the saturated hydrocarbons, such as n-hexane or isooctane. Furthermore, the catalytic reaction products may be formed and then added to the process in an inert diluent. It is preferred that the reaction products be formed at substantially room temperatures, or in other words, temperatures within the range of about 25° to 30° C. The reaction has an induction period which may vary over an extended period. The induction period may be reduced by the use of an initiator, such as titanium tetrachloride or by raising the temperature.

As has been noted hereinbefore, the reaction product of carbon tetrachloride with aluminum diethylchloride differs from the reaction product formed by admixing carbon tetrachloride with aluminum ethyldichloride. One of the differences noted is in the induction period in that the induction period for carbon tetrachloride and aluminum diethylchloride without initiation at room temperature may be several days. The induction period, on the other hand, is substantially less for the reaction to occur between carbon tetrachloride and aluminum ethyldichloride. In either case, once the reaction begins it occurs almost instantaneously.

It has been found that the induction period may be reduced substantially and almost eliminated when the reaction product is formed in situ in the desired process. It appears that the olefins which are present in the polymerization, copolymerization or alkylation processes act as initiators for the reaction between that carbon tetrahalide or alkyl haloform and a compound selected from an aluminum trialkyl, aluminum dialkylhalide or aluminum alkyldihalide. It is accordingly preferred, especially in the polymerization reactions, to form the reaction products of the present invention in situ. The polymerization, copolymerization or alkylation processes may be carried out at temperatures within the range of about −70° to about 100° C., and the reaction products of the present invention are formed in situ.

The present invention is further illustrated by the following examples which are set forth to merely illustrate and not to limit the present invention.

*Example 1*

Aluminum triethyl (0.05 ml.) is admixed with 1.0 ml. of carbon tetrachloride in a flask. The flask is maintained at room temperature, and a heat of reaction is observed due to the reaction of the aluminum triethyl and carbon tetrachloride. An analysis of the solution indicates the presence of aluminum diethylchloride and ethylchloroform. The mixture is maintained at room temperature for a period of several hours without any further reaction. Thereafter, 0.01 ml. of $TiCl_4$, equivalent to about 1% of the solution, is added to the flask. This initiates a vigorous and exothermic reaction which produces a black viscous material having catalytic properties.

*Example 2*

Aluminum triethyl (0.08 ml.) is placed in a small vial with 1.92 ml. of carbon tetrachloride. The vial is allowed to remain standing at normal room temperature (about 72° F.) to determine the reactivity of the aluminum triethyl and carbon tetrachloride. After standing for some time, a black precipitate is formed. To the mixture in the vial is added 1 ml. of pentene-1, and a rapid and complete polymerization of the pentene-1 results in a viscous oil.

*Example 3*

Aluminum triethyl (0.2 ml.) is admixed with 2 ml. of carbon tetrachloride. After an induction period, a reaction occurs producing a black precipitate. The precipitate is evaporated from the residual liquid phase and washed several times with carbon tetrachloride. The precipitate, along with 1 ml. of carbon tetrachloride and 0.5 ml. of pentene-1, is added to a reaction vessel whereupon a rapid polymerization of the pentene-1 occurs.

*Example 4*

To a 500 ml. flask is added 2 ml. of aluminum ethyldichloride and 198 ml. of carbon tetrachloride. A reaction occurs at room temperature to form a black precipitate. Thereafter, propylene at atmospheric pressure is admitted to the flask containing the black precipitate suspended in the carbon tetrachloride, and a rapid polymerization of the propylene occurs yielding a viscous oil.

*Example 5*

To a 500 ml. flask is added 1 ml. of aluminum ethyldichloride and 99 ml. of carbon tetrachloride. A reaction occurs at room temperature producing a black precipitate. Ethylene is then added at atmospheric presure and room temperature to the flask resulting in a rapid polymerization to yield a small amount of viscous oil.

*Example 6*

To a 500 ml. flask is added 2 ml. of aluminum ethyldichloride and 198 ml. of carbon tetrachloride. The flask is filled with propylene gas to atmospheric pressure before any reaction between the aluminum ethyldichloride and carbon tetrachloride is evident. A rapid polymerization of the propylene occurs yielding a viscous oil.

*Example 7*

To a flask is added 1 ml. of aluminum ethyldichloride and 99 ml. of ethylchloroform. To the flask is further added ethylene sufficient to maintain atmospheric pressure, and a polymerization of the ethylene occurs yielding and oil.

*Example 8*

To a flask is added 0.093 g. of triphenyl aluminum and 5 ml. of carbon tetrachloride. To the flask is further added 1 ml. of pentene-1. A black precipitate forms after which the pentene-1 is completely polymerized to a viscous oil.

*Example 9*

In a flask at room temperature, 10 ml. of carbon tetrachloride and 0.5 ml. of aluminum ethyldichloride are mixed. A reaction occurs resulting in a dark brown material being formed. The mixture is cooled to −18° C. after which 1.5 g. of isobutylene is introduced. The resulting mixture is allowed to react for 40 minutes after which 1 g. of heavy viscous oil is recovered.

*Example 10*

In a flask at room temperature, 10 ml. of carbon tetrachloride and 0.5 ml. of aluminum diethylchloride are mixed. After an induction period, a reaction occurs which produces a dark viscous material which is partially disslovled in the excess carbon tetrachloride. The mixture is transferred to a polymerization vessel, and an equal volume of isooctane is added. The solution is cooled to the temperature of a Dry Ice acetone bath after which 1.5 g. of isobutylene is introduced. The polymerization is allowed to proceed for 105 minutes. One gram of polyisobutylene rubber is recovered.

*Example 11*

To a reaction flask at room temperature is mixed 2 ml. of carbon tetrachloride, 1 ml. of pentene-1, 0.5 ml. of benzene and 0.05 ml. of aluminum triethyl. After standing overnight, a reaction occurs. An infrared analysis of the product shows that amylbenzene is one of the major components.

The oils formed in the polymerization and copolymerization processes may be formed having various molecular weights. The oils have considerable utility as lubricating and specialty oils. The polyisobutylene formed is useful as an elastomer as well as its known uses. The alkylated aromatics produced are known, and their uses as chemical solvents and intermediates are well established.

The nature and object of the present invention having been completely described and illustrated and the best mode thereof contemplated set forth, what I wish to claim as new and useful and secure by Letters Patent is:

1. In a process for the polymerization of olefins the improvement which consists of utilizing as the catalyst the reaction product formed by admixing a compound having the formula selected from the group consisting of $CX_4$ and $RCX_3$, where X is selected from the group consisting of Cl and Br and R is a $C_1$ to $C_{10}$ alkyl with a compound having the formula, $AlR_{3-n}X_n$, where R is selected from the group consisting of lower alkyl and aryl, X is selected from the group consisting of Cl and Br and $n$ is selected from the numbers 0, 1 and 2.

2. In a process according to claim 1 wherein the reaction product formed by admixing carbon tetrachloride and aluminum triethyl is utilized as the catalyst.

3. In a process according to claim 1 wherein the reaction product formed by admixing carbon tetrachloride and aluminum ethyldichloride is utilized as the catalyst.

4. In a process according to claim 1 wherein said olefins are ethylene and propylene.

5. In a process for the polymerization of olefins the improvement which consists of admixing with the olefin under polymerization conditions a compound having the formula selected from the group consisting of $CX_4$ and $RCX_3$, where X is selected from the group consisting of Cl and Br and R is a $C_1$ to $C_{10}$ alkyl with a compound having the formula, $AlR_{3-n}X_n$, where R is selected from the group consisting of a lower alkyl and aryl, X is selected from the group consisting of Cl and Br and $n$ is selected from the numbers 0, 1 and 2.

6. In a process according to claim 5 wherein carbon tetrachloride and aluminum triethyl are admixed with said olefin.

7. In a process according to claim 5 wherein carbon tetrachloride and aluminum diethylchloride are admixed with said olefin.

8. In a process according to claim 5 wherein carbon tetrachloride and aluminum ethyldichloride are admixed with said olefin.

9. In a process for the alkylation of aromatics with olefins the improvement which consists of utilizing as the catalyst the reaction product formed by admixing a compound having the formula selected from the group consisting of $CX_4$ and $RCX_3$, where X is selected from the group consisting of Cl and Br and R is a $C_1$ to $C_{10}$ alkyl with a compound having the formula, $AlR_{3-n}X_n$, where R is selected from the group consisting of lower alkyl and aryl, X is selected from the group consisting of Cl and Br and $n$ is selected from the numbers 0, 1 and 2.

10. In a process for the alkylation of aromatics with olefin the improvement which consists of admixing with said olefin and aromatic under alkylation conditions a compound having the formula selected from the group consisting of $CX_4$ and $RCX_3$, where X is selected from the group consisting of Cl and Br and R is a $C_1$ to $C_{10}$ alkyl with a compound having the formula, $AlR_{3-n}X_n$, where R is selected from the group consisting of lower alkyl and aryl, X is selected from the gorup consisting of Cl and Br and $n$ is selected from the numbers 0, 1 and 2.

References Cited by the Examiner
UNITED STATES PATENTS 2,907,805 10/1959 Bestian et al. _____ 260—683.15
3,031,514 4/1962 Kosmin _____ 260—671

DELBERT E. GANTZ, *Primary Examiner.*

C. R. DAVIS, *Assistant Examiner.*